United States Patent [19]

Gressett, Jr.

[11] Patent Number: 5,042,316

[45] Date of Patent: Aug. 27, 1991

[54] TRANSMISSION LINKAGE

[75] Inventor: Charles A. Gressett, Jr., Eagle Rock, Calif.

[73] Assignee: Quadrastat Corporation, City of Industry, Calif.

[21] Appl. No.: 498,588

[22] Filed: Mar. 26, 1990

[51] Int. Cl.⁵ .............................................. G05G 7/06
[52] U.S. Cl. .................................................. 74/473 R
[58] Field of Search .................... 74/473 R, 474, 475, 74/491

[56] References Cited

U.S. PATENT DOCUMENTS

| 3,082,638 | 3/1963 | Nilson | 74/473 |
| 4,370,897 | 2/1983 | Carlo | 74/473 R X |
| 4,709,793 | 12/1987 | Sokakibara et al. | 74/473 R |

Primary Examiner—Richard E. Moore
Attorney, Agent, or Firm—William W. Haefliger

[57] ABSTRACT

A transmission control linkage for positioning elements in a transmission housing in response to selector movement between at least four positions, and characterized in that two different selector positions correspond to the same positions of the elements in the housing. The linkage typically has three links, including a first link, a second link pivotally connected to the first link at a primary pivot, a third link pivotally connected to the second link at a secondary pivot; a linkage carrier means; and the first and third links pivotally mounted relative to the carrier means at tertiary and fourth pivots for causing the third link to rotate counterclockwise through an angular range α and then to rotate clockwise through an angular range β, in response to counterclockwise rotation of the first link through an angular range α.

15 Claims, 5 Drawing Sheets

TRANSMISSION LINKAGE

BACKGROUND OF THE INVENTION

This invention relates generally to control of transmission apparatus, and more particularly, to a linkage and associated structure allowing return of the transmission elements effectively to NEUTRAL position, whenever a manual selector is moved to PARK (BRAKE) position, as well as to NEUTRAL position.

Transmissions conventionally have FORWARD, NEUTRAL and REVERSE selector positions. The absence of a PARK position requires the operator to first shift into neutral and then manually apply the parking brakes in order to safely park the vehicle. This is commonplace in the trucking industry and requires familiarity with this system. However, there is potential for having drivers who are unfamiliar with operating a system of this type, and it is reasonable to consider that such a driver might push the gear selector away from himself/herself as far as it will go, and expect to be in PARK position.

Accordingly, there is need for a mechanical selector for the above-mentioned transmission, that indeed has a PARK/BRAKE position. It is further desirable that the transmission be returned to the NEUTRAL position when the selector indicates "PARK/BRAKE". Simultaneously, a mechanical movement should trigger either an electrical switch or a pneumatic valve in order to thereby apply the vehicle's parking brake device.

SUMMARY OF THE INVENTION

It is a major object of the invention to provide a transmission control which meets the above need. Basically, the invention is embodied in a transmission control linkage for positioning elements in a transmission housing in response to selector movement between at least four positions, and characterized in that two different selector positions correspond to the same position of the elements in the transmission housing. The apparatus comprises:
  (a) a linkage having three links, including:
    (i) a first link,
    (ii) a second link pivotally connected to the first link at a primary pivot,
    (iii) a third link pivotally connected to the second link at a secondary pivot,
  (b) a linkage carrier means, and
  (c) the first and third links pivotally mounted to or relative to the carrier means at tertiary and fourth pivots for causing the third link to rotate counterclockwise through an angular range $\alpha$ and then to rotate clockwise through an angular range $\beta$, in response to selector induced counterclockwise rotation of the first link through an angular range $\alpha$.

As will be seen, the control is typically such that the angle $\beta = -\alpha$, the primary pivot being offset from the tertiary pivot, and the secondary pivot being offset from the fourth pivot.

It is another object to provide detent means associated with the linkage to releasably retain the linkage in selected positions; and wherein the selected positions correspond to successive angular positions of the first link in the counterclockwise direction. Such successive angular positions typically correspond to
  PARK transmission position
  REVERSE transmission position
  NEUTRAL transmission position
  DRIVE transmission position The detent means typically may include a rotor carried by the transmission actuator shaft which defines the fourth pivot, and the detent means may include a resiliently yieldable element operatively connected to a transmission housing and engageable with detent shoulders defined by the rotor.

These and other objects and advantages of the invention, as well as the details of an illustrative embodiment, will be more fully understood from the following specification and drawings, in which:

DRAWING DESCRIPTION

DETAILED DESCRIPTION

Figure 1:
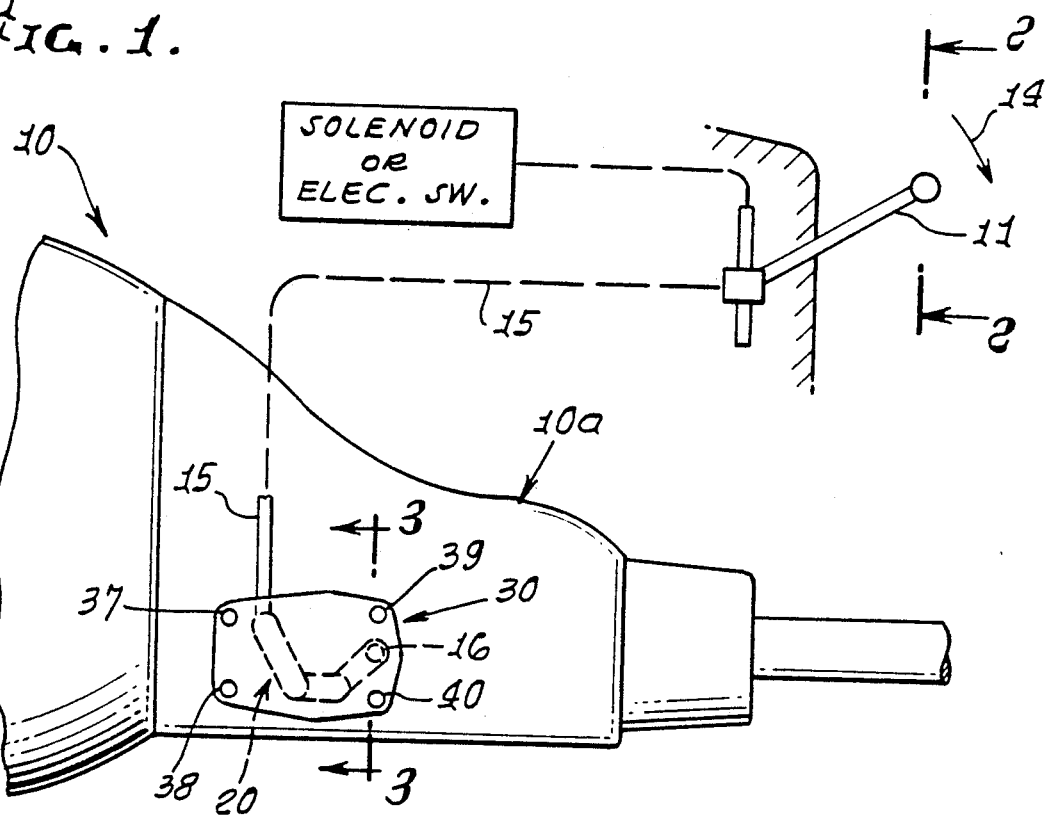
FIG. 1 is an elevation showing a system embodying the invention.
Figure 2:
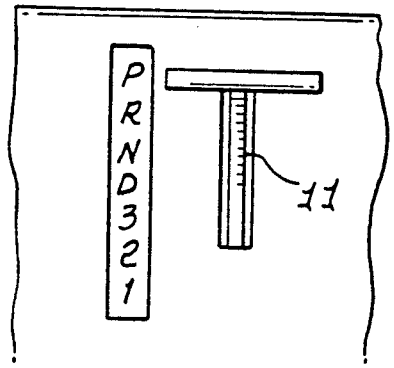
FIG. 2 is a view taken on lines 2—2 of FIG. 1.
Figure 3:
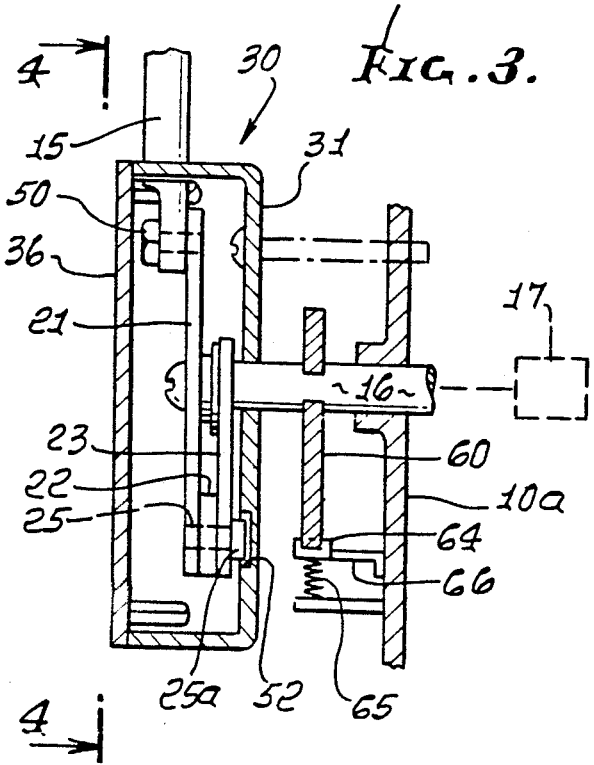
FIG. 3 is an enlarged section taken in elevation on lines 3—3 of FIG. 1.

Referring to FIGS. 1-3, a transmission 10 as for use in a vehicle drive train, has an associated selector 11 operatively connected with the transmission gearing or other drive ratio changing elements within a housing 10a. The selector 11, which may comprise a lever, is typically movable between at least four positions. (See for example arrow 14 in FIG. 1 indicating a direction of selector movement between such positions.) Thus, by movement in one direction, the selector may move a motion transmitting cable 15 successively between "PARK", "REVERSE", "NEUTRAL", and "DRIVE" positions seen in FIGS. 4-7 for example.

The positions of the transmission element or elements to be shifted, within housing 10a, correspond to different angular positions of a shaft 16. FIG. 3 shows that shaft, as well as schematically showing such elements at 17 (to be shifted in response to shaft rotation). A linkage 20 is operatively connected between the cable 15 and the shaft 16 to transmit motion therebetween; and it is a feature of the connection that the linkage is such that, in positioning the transmission elements 17 in response to unidirectional movement of the selector (see arrow 14), two different selector positions will nevertheless correspond to one and the same position of the shaft 16 (and thus one and the same position of the elements 17). For example, see the angular position of the shaft 16 in FIGS. 4 and 6, that angular position being the same in those views.

In FIGS. 4-10, the linkage is shown to comprise three links, including a first link 21, a second link 22, and a third link 23. Links 21 and 22 are interconnected at a primary pivot location, as may be defined by a pivot pin 24; and links 22 and 23 are interconnected at a secondary pivot location, as may be defined by a pivot pin 25. Cable end 15a is connected to one end 21a of link 21, as by pin connection 50, and pin 24 is connected to the opposite end 21b of link 21. Shaft 16 is fixedly connected to one end 23a of link 23, and pin 25 is connected to the opposite end 23b of link 23, as shown.

A linkage carrier means is provided, as at 30, and may take the form of a plate 31 attached at 32-35 to the transmission housing 10a. See FIGS. 1 and 3. Plate 31 may be part of an enclosure for the linkage, as represented by cover 36 attached via fasteners 37-40 to peripheral flanges 41-44 integral with the plate.

The first and third links 21 and 23 are pivotally mounted to the carrier means at tertiary and fourth pivots for causing the third link to rotate counterclockwise through an angular range $\alpha$ and then to rotate clockwise through an angular range $\beta$, in response to counterclockwise rotation of the first link through an angular range $\alpha$. In the example, (tertiary) pivot pin 46 carried by plate 31 pivotally supports link 21 to pivot about that pin axis, the pin 46 being located intermediate the link opposite end portions 21a and 21b.

Shaft 16 provides the fourth pivot serving to pivotally mount the third link 23 for pivoting relative to the carriage means 30, in response to rotation of link 21 about the axis of pin 46. Note that primary pivot at 24 is offset from the tertiary pivot at 46; and the secondary pivot at 25 is offset from the fourth pivot at 16.

Figure 4:
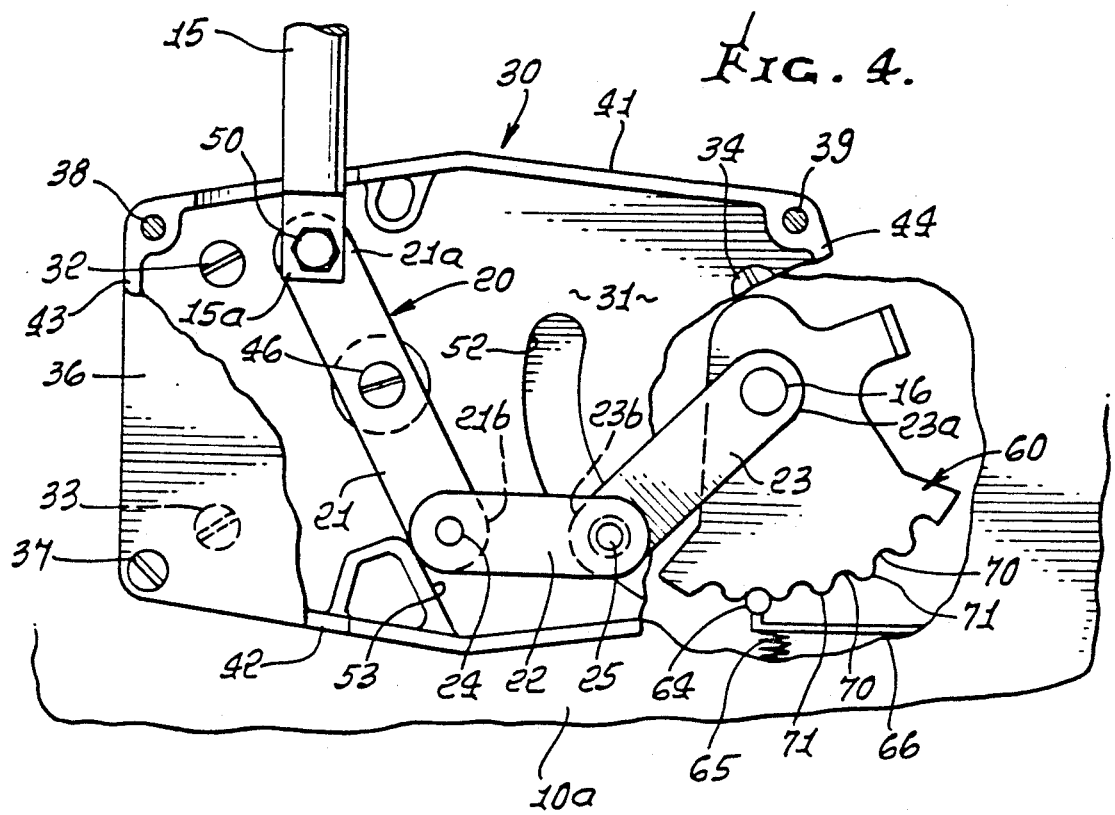
FIG. 4 is an elevation taken in section on lines 4—4 of FIG. 3 showing a linkage in a transmission "PARK" position.
Figure 5:
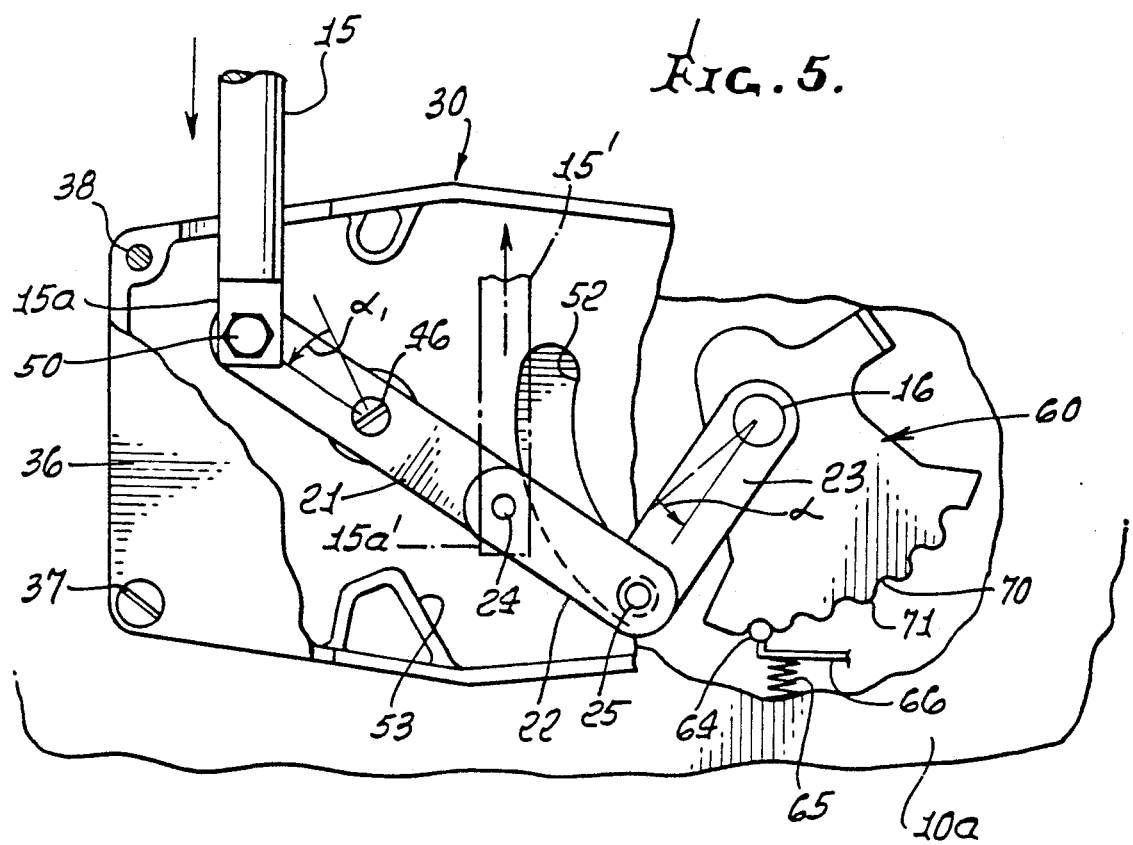
FIG. 5 is a view like FIG. 4 showing the linkage in transmission "REVERSE" position.
Figure 6:
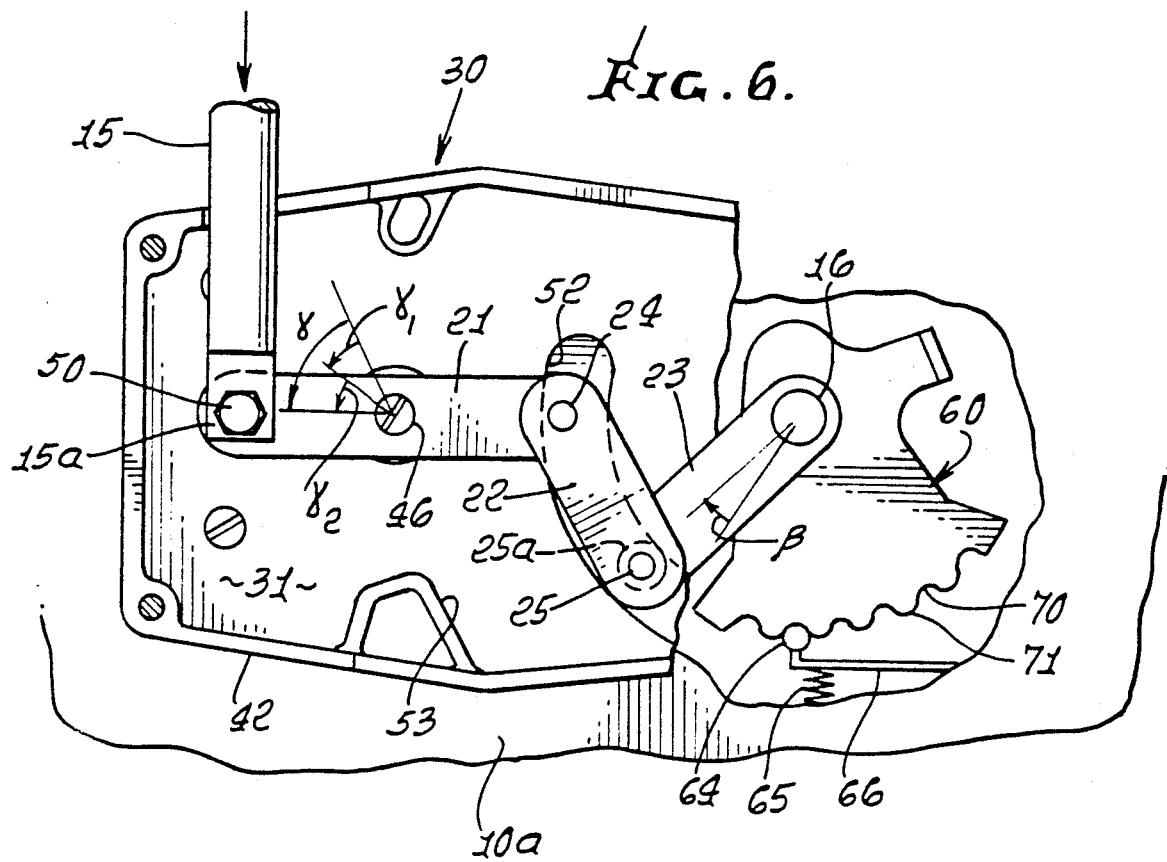
FIG. 6 is a view like FIG. 4 showing the linkage in transmission "NEUTRAL" position.

Considering FIGS. 4 and 5, as the cable end 15a is displaced downwardly from FIG. 4 (PARK position) to FIG. 5 (REVERSE position), the first link rotates counterclockwise through an angular range $\alpha_1$, and the third link rotates counterclockwise through an angular range $\alpha$; thereafter, as the cable end 15a continues to be displaced downwardly from FIG. 5 (REVERSE position) to FIG. 6 (NEUTRAL position), the first link again is rotated counterclockwise through an angular range $\alpha_2$, but the third link rotates clockwise through an angle $\beta$. The angular relationship may typically be further defined as follows:

$$\beta = -\alpha$$
$$\gamma_1 + \gamma_2 = \gamma$$

Accordingly, the third link 23 and shaft 16 are rotated back to FIG. 4 angular position in space, whereby insofar as the transmission is concerned, PARK position is the same as NEUTRAL position.

Figure 7:
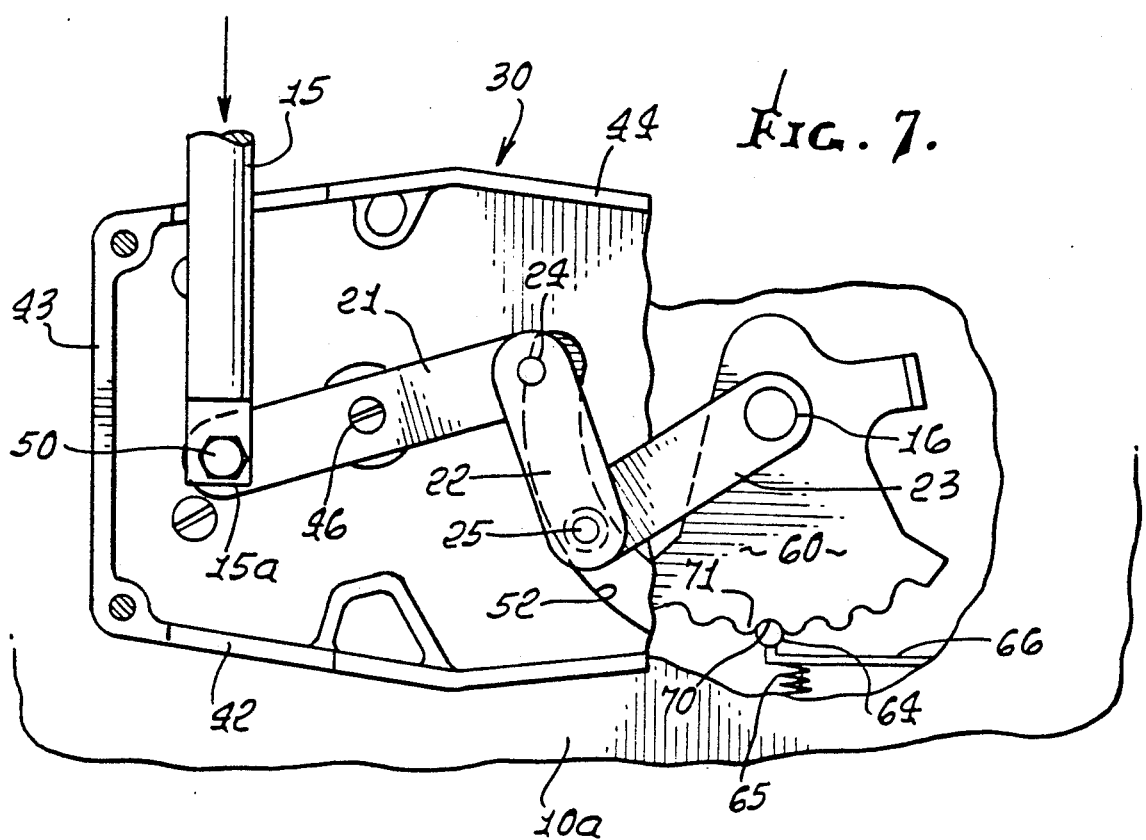
FIG. 7 is a view like FIG. 4 showing the linkage in transmission "DRIVE" position.

In FIG. 7, the cable end 15a has been further displaced downwardly from FIG. 6 position to produce DRIVE (transmission) position of shaft 16, the link 21 thereby being further rotated counterclockwise and the link 23 having been further rotated clockwise.

Figure 8:
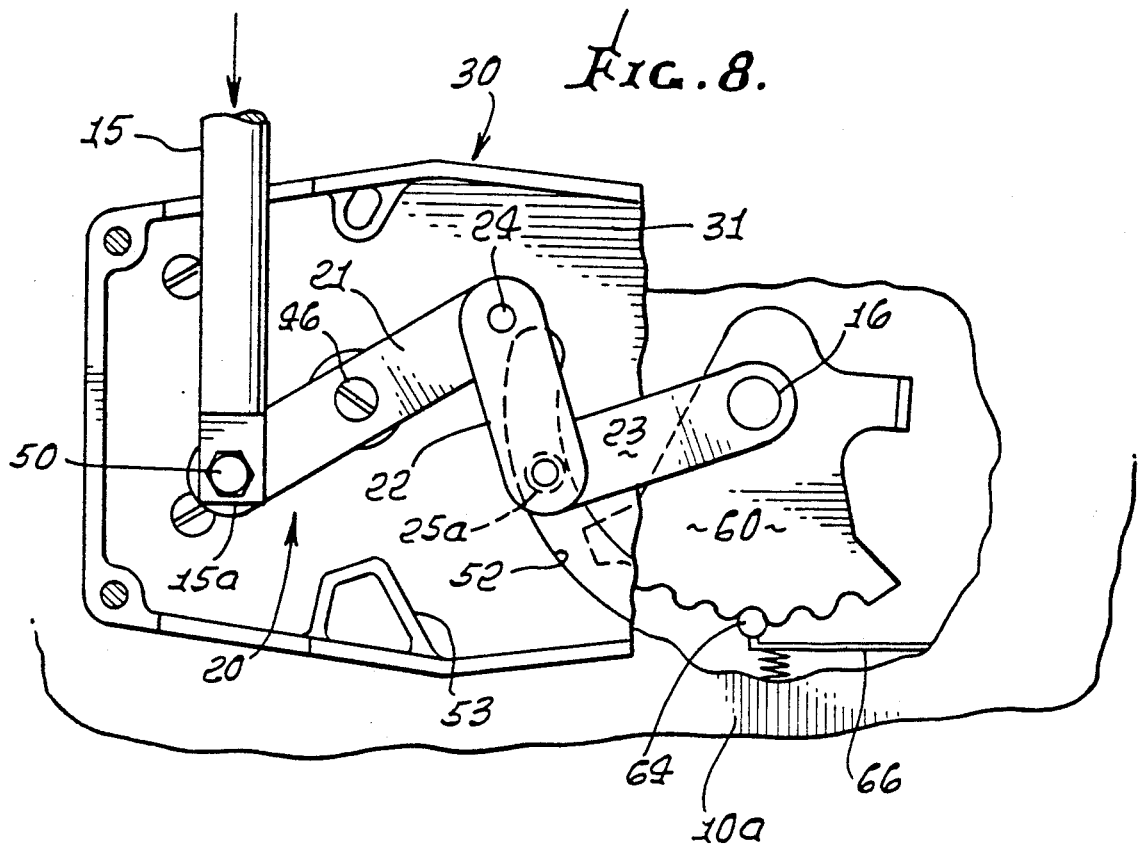
FIGS. 8-10 are also views like FIG. 4 showing the linkage in successive additional transmission drive positions.

In FIG. 8 the cable end 15a has been further displaced downwardly from FIG. 7 position to produce DRIVE-3 (transmission) position of shaft 16, the link 21 thereby being further rotated counterclockwise, and the link 23 having been further rotated clockwise.

Figure 9:
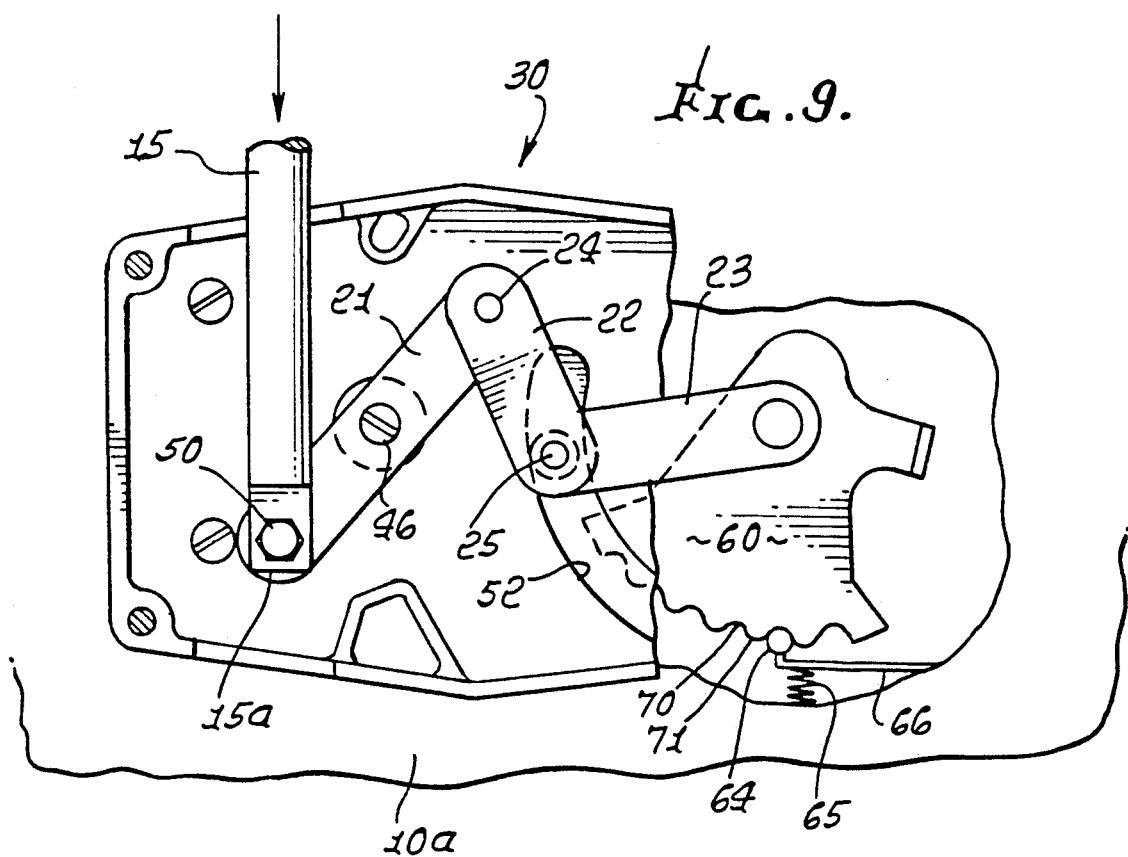

In FIG. 9, the cable end 15a has been even further displaced downwardly from FIG. 8 position to produce DRIVE-2 (transmission) position of shaft 16, the link 21 thereby being even further rotated counterclockwise, and the link 23 having been even further rotated clockwise.

Figure 10:
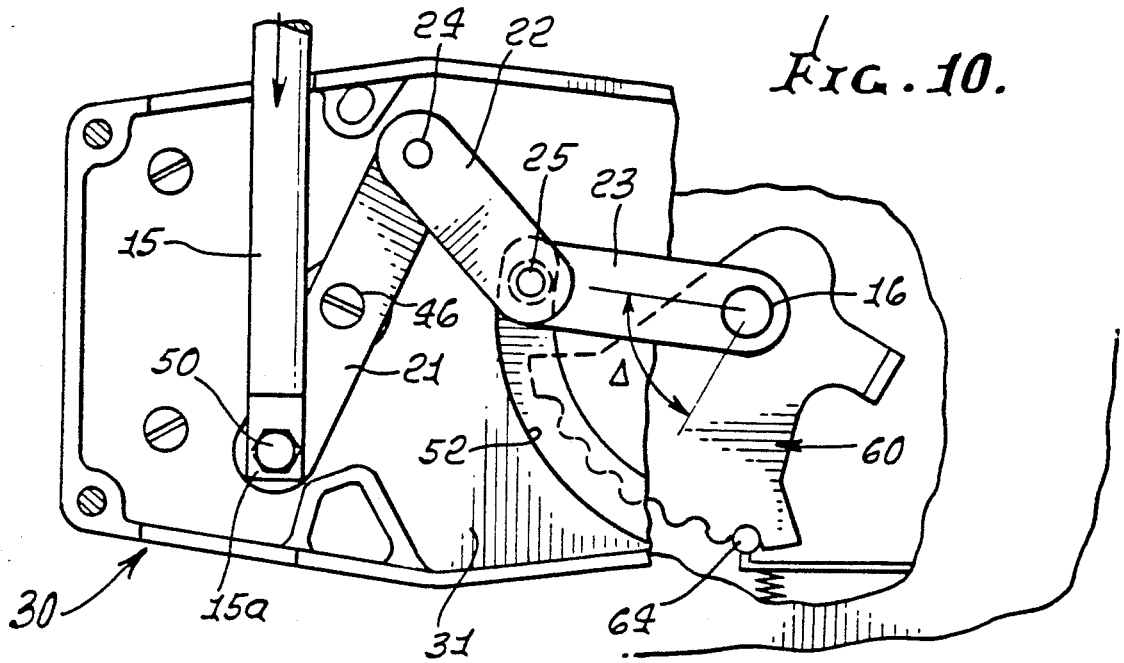

FIG. 10 shows the cable end 15a still further displaced downwardly, and link 23 yet further rotated clockwise, with shaft 16 in DRIVE-1 (transmission) position.

Note that in the sequence from FIG. 4 to FIG. 10, the cable end 15a is displaced generally unidirectionally, i.e., downwardly.

Also provided is a guide means on the carrier to guide pivoting of the third link through its pivot range $\Delta$, corresponding to FIG. 5 and 10 positions. Such guide means takes the form of an arcuate slot 52 cut in the plate 31 for guiding the head 25a of pin 25, as seen in FIGS. 3 and 4. Stop means provided by abutment 53 on the carrier, is positioned to limit clockwise pivoting of the first link 21 on upward return of the cable end 15a to FIG. 4 position.

Detent means is also provided in association with the linkage to releasably retain the linkage in selected positions, the latter corresponding to successive angular positions of the first link, in clockwise direction, as is clear from FIGS. 4-7, and also 4-10 in this example. Such angular positions (FIGS. 4-7) correspond to:

PARK transmission position
REVERSE transmission position
NEUTRAL transmission position
DRIVE transmission position and wherein the REVERSE position corresponds to one end of the range $\alpha$ and the NEUTRAL position corresponds to one end of the range $\beta$. Note that REVERSE position (FIG. 5) corresponds to one end of the range $\alpha$; and that NEUTRAL position (FIG. 6) corresponds to one end of range $\beta$;

In the example, the detent means includes a rotor plate 60 fixedly carried by the shaft 16, which serves as an actuator shaft for positioning transmission elements within the housing, as explained above. A resiliently yieldable detent element 64 is operatively connected to the transmission housing 10a, to be engageable with detent shoulders defined by the rotor, as it rotates with shaft 16. See the slots 70 and associated cam shoulders 71 along an arc at the periphery of the rotor plate, and successively engageable by the element 64 urged by spring 65 toward the rotor. Element 64 may be supported by a cantilevered part, such as flat spring 66 attached to housing 10a, or to the carrier 30 attached to 10a.

Figure 11:
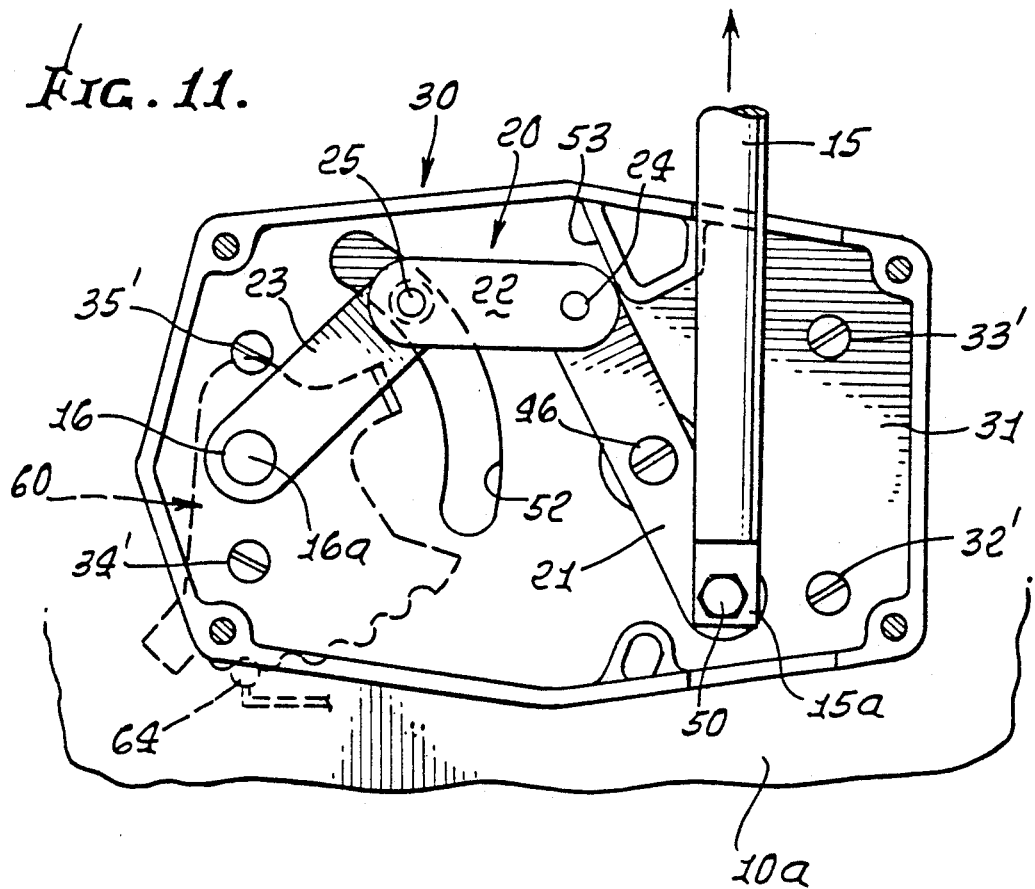
FIG. 11 is a view like FIG. 4 but showing the linkage in an inverted position.

FIG. 11 shows the carrier means 30 in an inverted position, as attached to housing 10a, thereby to enable the cable end 15a to be advanced successively upwardly (instead of downwardly) in order to displace the linkage between the succession of positions, as referred to in FIGS. 4-10. For this purpose, means is provided to support the carrier means to pivot about an axis which coincides with the axis of the fourth pivot, i.e., the axis 16a of shaft 16. Such support means may be considered to include the alternate positions of the fasteners, 32' to 35', as seen in FIG. 11, attached to housing 10a.

FIG. 5 shows an alternate position of the cable, indicated at 15', and having its end 15a' connected to link 21 at pivot 24.

I claim:

1. In a transmission control linkage for positioning elements in a transmission housing in response to selector movement between at least four positions, and characterized in that two different selector positions correspond to the same position of the elements in the housing, the combination comprising:
   (a) a linkage having three links, including:
      (i) a first link, (ii) a second link pivotally connected to the first link at a primary pivot,
(iii) a third link pivotally connected to the second link at a secondary pivot,
(b) a linkage carrier means, and
(c) the first and third links pivotally mounted relative to the carrier means at tertiary and fourth pivots for causing the third link to rotate counter-clockwise through an angular range $\alpha$ and then to rotate clockwise through an angular range $\beta$, in response to selector induced counterclockwise rotation of the first link through an angular range $\alpha$.

2. The combination of claim 1 wherein $\beta = -\alpha$.

3. The combination of claim 1 where the primary pivot is offset from the tertiary pivot, and the secondary pivot is offset from the fourth pivot.

4. The combination of claim 1 including guide means on the carrier to guide pivoting of the third link through said range $\alpha$.

5. The combination of claim 4 including stop means on the carrier to limit pivoting of the first link at one end of said angular range $\alpha$.

6. The combination of claim 1 including means pivotally supporting the carrier means to pivot about an axis which coincides with the fourth pivot.

7. The combination of claim 1 including detent means associated with the linkage to releasably retain the linkage in selected positions.

8. The combination of claim 7 wherein said selected positions correspond to successive angular positions of the first link in said counterclockwise direction.

9. The combination of claim 8 wherein said successive angular positions correspond to:
PARK transmission position
REVERSE transmission position
NEUTRAL transmission position
DRIVE transmission position
and wherein said REVERSE position corresponds to one end of said range $\alpha$ and said NEUTRAL position corresponds to one end of said range $\beta$.

10. The combination of claim 9 wherein said fourth pivot comprises a transmission actuator shaft.

11. The combination of claim 10 wherein said detent means includes a rotor connected to said transmission actuator shaft.

12. The combination of claim 11 wherein said detent means comprises a resiliently yieldable element operatively connected to a transmission housing and engageable with detent shoulders defined by the rotor.

13. The combination of claim 9 including means on the carriage means to limit clockwise pivoting of said first link in said PARK transmission position.

14. The combination of claim 1 wherein said links define a three-bar linkage wherein the first link is pivoted to said carrier means intermediate its ends and one end thereof is connected to an actuator, and the third link is effectively pivoted to said carrier means via a transmission operating shaft.

15. The combination of claim 1 including said selector, and a cable connected between the selector and said first link.

* * * * *